Patented Apr. 14, 1931

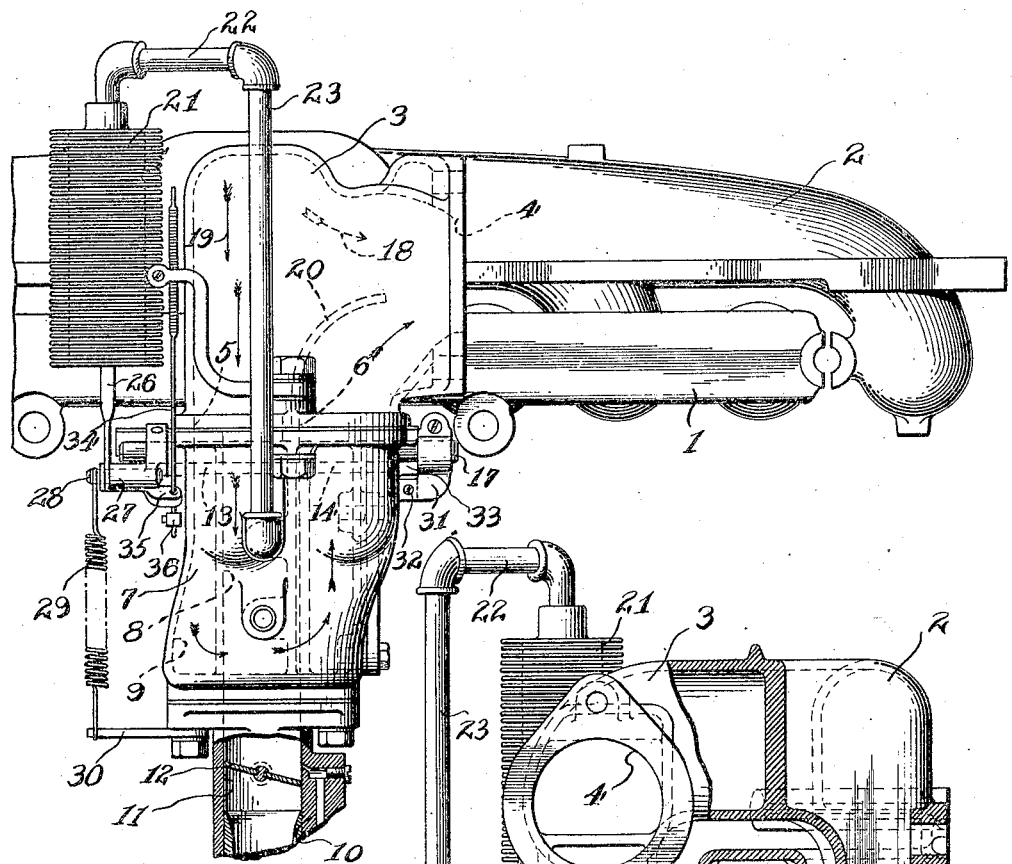

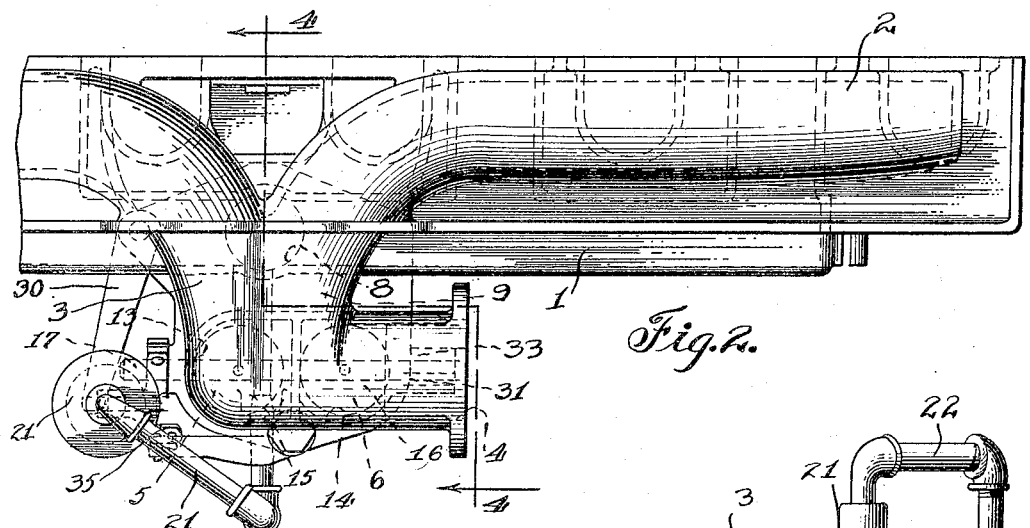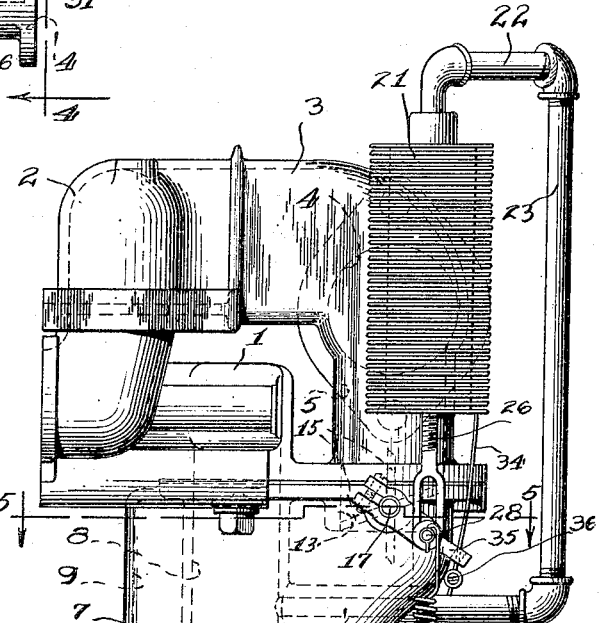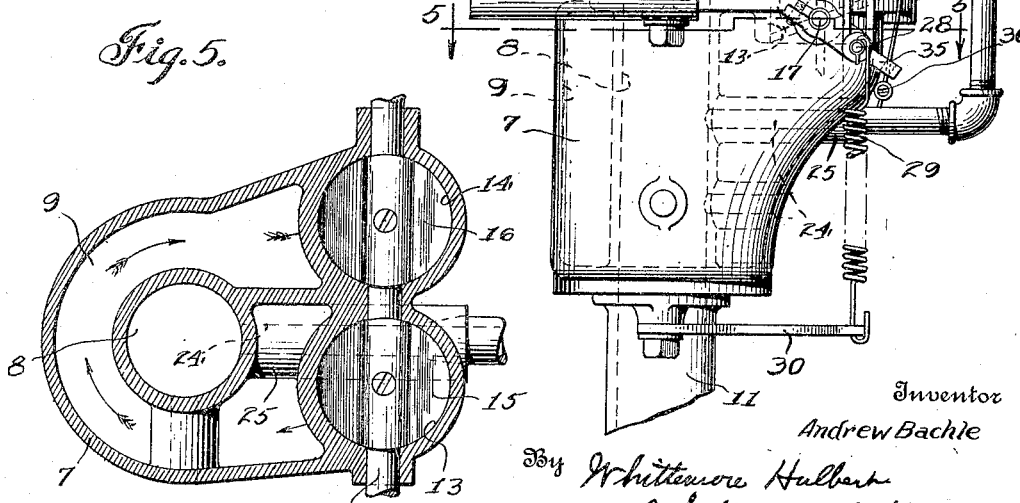

1,800,426

UNITED STATES PATENT OFFICE

ANDREW BACHLE, OF DETROIT, MICHIGAN

HEAT-CONTROL APPARATUS FOR INTAKE GASES OF INTERNAL-COMBUSTION ENGINES

Application filed January 10, 1927. Serial No. 160,216.

The invention relates to heat control apparatus for intake gases of internal combustion engines and has for its main object the provision of an improved manifold construction for providing heat to the intake gases to vaporize and break up the liquid fuel carried in the intake gases. Another object is to provide an automatic device which is dependent upon the pressure within the intake manifold and consequently in general the speed of the engine to control the supply of heat. A further object is to provide a stove through which the intake gases pass arranged with an inlet opening in the direct path of the exhaust gases passing through the exhaust manifold. With these as well as other objects in view, the invention resides in the novel features of construction and combinations and arrangements of parts as more fully hereinafter set forth.

In the drawings:—

Figure 1 is a side elevation of a heat control apparatus, embodying my invention;

Figure 2 is a plan view thereof;

Figure 3 is an end view thereof;

Figure 4 is a cross section on the line 4—4 of Figure 2;

Figure 5 is a cross section on the line 5—5 of Figure 3.

As shown in the present instance, 1 and 2 are respectively the intake and exhaust manifolds of a multi-cylinder internal combustion engine. These manifolds are preferably cast integral, with the exhaust manifold extending above the intake manifold and having the centrally located discharge section 3 which extends laterally over and depends at the side of the intake manifold. This discharge section is also preferably cast integral with the exhaust and intake manifolds and has the main discharge opening 4 at its discharge end and the auxiliary discharge opening 5 and inlet opening 6 in its bottom, the auxiliary discharge opening being in the direct path of the exhaust gases passing through the discharge section.

7 is a stove secured to the bottoms of the intake manifold and discharge section and provided with the vertically extending intake passage 8 and the surrounding chamber 9. The intake passage communicates with the intake manifold 1 centrally thereof and through its bottom wall and also communicates with the carburetor 10 through the riser 11 which is secured to the bottom of the stove and has the throttle valve 12 therewithin. The chamber 9 has the inlet passage 13 vertically below and communicating with the auxiliary discharge opening 5 of the discharge section and also has the outlet passage 14 vertically below and communicating with the inlet opening 6 in the discharge section. 15 and 16 are butterfly valves respectively located in the inlet and outlet passages and upon the shaft 17 which extends transversely through these passages. These valves control the passage of the exhaust gases through the chamber 9 and around the intake passage 8, the arrangement being such that when the valves are closed the exhaust gases pass through the exhaust manifold in the direction taken by the dotted arrows 18. However, when the valves are opened the exhaust gases or at least a part thereof pass through the exhaust manifold and the stove in the directions taken by the full arrows 19, at which time the intake gases passing through the intake passage 8 are heated. To assist in directing the exhaust gases passing through the discharge section 3 to the auxiliary discharge opening 5 and the inlet passage 13, I have provided a deflector 20 which is preferably cast integrally with the discharge section and curved to assist in allowing the exhaust gases to pass out through the outlet passage 14 and the inlet opening 6 to the main discharge opening 4 of the discharge section.

For the purpose of automatically controlling the exhaust gases passing through the stove, I have provided means dependent upon the pressure within the intake manifold and consequently dependent in general upon the speed of the engine. In detail, 21 is a bellows which extends vertically at the side of the discharge section 3 and is connected at its upper end by the pressure transmitting conduit 22 to the intake passage 8 of the stove. This conduit comprises a pipe 23 which extends from the upper end of the bellows to the wall of the stove and a tubular passage 24 formed in the transverse boss 25 which extends from the outer wall of the stove to its inner wall. The lower end of the bellows is connected by the link 26 to the lever 27 which is fixedly secured to one end of the shaft 17. The link 26 is preferably provided with a vertically extending slot through which the pin 28 extends, this pin being mounted in the lever 27. To normally return the valves to their closed positions, I have provided the coil spring 29, one end of which is connected to the pin 28 and the other end of which is connected to the arm 30 secured to the bottom of the stove. To control the closed positions of the valves, I have provided the lever 31 which is fixedly secured to the opposite end of the shaft 17 and has adjustably mounted therewithin the set screw 32 which is adapted to abut the lug 33 formed integral with the stove. For manually adjusting the valves there is the flexible cable 34 which has one end located upon the dash of the motor vehicle so that it may be readily operated by the driver and the other end extending through the lug 35 upon the lever 27 and to which is secured the abutment member 36 engageable with the under side of the lug so that upon pulling the flexible cable the lever will be swung to open the valves.

In operation and with the engine running, the positions of the valves 13 and 14 depend upon the pressure which is sub-atmospheric within the intake manifold. At low engine speeds when the intake manifold should be at its highest temperature to vaporize and break up the liquid fuel the sub-atmospheric pressure within the intake manifold is lowest by reason of the throttle valve being nearly closed and the valves controlling the passage of the exhaust gases through the stove are open owing to the bellows being contracted in length by this sub-atmospheric pressure. At high engine speeds when the intake manifold requires little or no heat because of the increased velocity of the intake gases keeping the liquid fuel in suspension and better atomized, the sub-atmospheric pressure within the intake manifold is near atmospheric pressure and the valves controlling the passage of the exhaust gases through the stove are closed because this sub-atmospheric pressure has no effect upon the bellows. The amount of heat applied to the intake manifold may be varied by substituting coil springs of different strength normally tending to hold the stove valves closed or by adjusting the flexible cable adapted to hold the stove valves in various open positions.

From the above description it will be readily seen that I have provided an improved manifold construction including a stove for heating the intake manifold and arranged in the direct path of the exhaust gases passing through the exhaust manifold. It will also be seen that the intake manifold has the minimum number of turns by reason of the intake passage through the stove being straight and connecting directly into the intake manifold proper. It will be further seen that the control device for supplying the heat to the intake manifold is of simple construction and may be compactly arranged with the manifolds.

What I claim as my invention is:

1. In heat control apparatus for intake gases of an internal combustion engine, the combination with an exhaust manifold having a discharge section, of a stove secured to said exhaust manifold, having an intake passage therethrough and a chamber at the side of said intake passage, said chamber having an inlet opening in the direct communication with said discharge section and an outlet opening communicating with said discharge section near its discharge end.

2. In heat control apparatus for intake gases of an internal combustion engine, the combination with an exhaust manifold having a discharge section, of a stove having an intake passage therethrough and a chamber surrounding said intake passage, said chamber having an inlet passage in the direct path of the exhaust gases passing through said discharge section and an outlet passage communicating with said discharge section near its discharge end, and valves in said inlet and outlet passages for controlling the passage of exhaust gases through said stove.

3. In heat control apparatus for intake gases of an internal combustion engine, the combination with an exhaust manifold having a discharge section, of a stove having an intake passage therethrough and a chamber surrounding said intake passage and provided with an inlet passage in the direct path of the exhaust gases passing through said discharge section, and an outlet passage communicating with said discharge section near its discharge end, a shaft extending transversely through said inlet and outlet passages, valves upon said shaft and located in said inlet and outlet passages for controlling the passage of exhaust gases through said stove and means dependent upon the pressure within said intake passage for operating said shaft.

4. In heat control apparatus for intake gases, the combination with an intake manifold and an exhaust manifold extending above said intake manifold and having a discharge section depending at the side of said intake manifold, of a stove secured to said intake manifold and discharge section and having a vertically extending intake passage therethrough and communicating with said intake manifold through its bottom wall, said stove also having a chamber surrounding said intake passage and provided with inlet and outlet passages below said discharge section and communicating therewith, said inlet passage being in the direct path of the exhaust gases passing through said discharge section.

5. In heat control apparatus for intake gases, the combination with an intake manifold and an exhaust manifold extending above said intake manifold and having a discharge section depending at the side of said intake manifold, of a stove secured to said intake manifold and discharge section and having a vertically extending intake passage therethrough and communicating with said intake manifold through its bottom wall, said stove also having a chamber surrounding said intake passage and provided with inlet and outlet passages below said discharge section and communicating therewith, said inlet passage being in the direct path of the exhaust gases passing through said discharge section, said outlet passage communicating with said discharge section near its discharge end, valves within said inlet and outlet passages for controlling the passage of exhaust gases through said stove, and means dependent upon the pressure within said intake manifold for operating said valves.

6. In heat control apparatus for intake gases of an internal combustion engine, the combination with an exhaust manifold having a discharge section, of a stove having a vertically arranged intake passage therethrough and a chamber surrounding said intake passage, said chamber having inlet and outlet passages in the top portion thereof below said discharge section in direct communication therewith, and valves in said inlet and outlet passages for controlling the passage of exhaust gases through said stove.

7. In heat control apparatus for intake gases of an internal combustion engine, the combination with an exhaust manifold having a discharge section, of a stove having a vertically arranged intake passage therethrough and a chamber surrounding said intake passage, said chamber having inlet and outlet passages in the top portion thereof arranged side by side below said discharge section in direct communication therewith, and valves in said inlet and outlet passages for controlling the passage of exhaust gases through said stove.

8. In heat control apparatus for intake gases of an internal combustion engine, the combination with an exhaust manifold having a discharge section, of a stove having a vertically arranged intake passage therethrough and a chamber surrounding said intake passage, said chamber having inlet and outlet passages in the top portion thereof arranged side by side below said discharge section, and a curved deflector extending upwardly into said discharge section between the inlet and outlet passages for directing the flow of the incoming and outgoing gases to and from said chamber.

9. In heat control apparatus for intake gases of an internal combustion engine, the combination with an exhaust manifold having a discharge section, of a stove having an intake passage therethrough and a chamber surrounding said intake passage and provided with an inlet passage in the direct path of the exhaust gases passing through said discharge section, and an outlet passage communicating with said discharge section near its discharge end, a shaft extending transversely through said inlet and outlet passages, valves upon said shaft and located in said inlet and outlet passages for controlling the passage of exhaust gases through said stove, a lever mounted upon and rotatable with said shaft, and manual and automatic means connected to said lever for operating said shaft.

10. In heat control apparatus for intake gases of an internal combustion engine, the combination with an exhaust manifold having a centrally located discharge section provided with a downwardly extending portion having a lateral discharge opening, of a stove below said discharge section having an intake passage therethrough and provided with an inlet opening in the direct path of the exhaust gases passing through said exhaust manifold.

11. In heat control apparatus for intake manifolds of an internal combustion engine, the combination with an exhaust manifold and an intake manifold, of a stove having an intake passage therethrough and provided with an inlet passage communicating with the exhaust manifold, a valve in said inlet passage for controlling the passage of exhaust gases through the stove, a bellows, pressure transmitting means between one end of said bellows and said intake manifold, a connection between the opposite end of said bellows and said valve for operating the latter from the former, and means for actuating said valve independently of the movement of said bellows.

12. In heat control apparatus for intake gases of internal combustion engines, the combination with an intake manifold, of an exhaust manifold adjacent having a discharge section provided with a main discharge passage, and having auxilliary inlet and outlet openings in a wall of said main discharge passage, and a stove secured to said intake manifold and discharge section and having an intake passage and a surrounding chamber, the intake passage being in communication with the intake manifold, and said chamber having openings respectively registering with the auxiliary inlet and outlet openings in the discharge section of said exhaust manifold, and means for controlling the passage of gases to and from said discharge section and stove.

13. In heat control apparatus for intake gases of an internal combustion engine, the combination with an intake manifold, of an exhaust manifold adjacent the intake manifold and having a laterally projecting discharge section, having a main discharge opening and provided adjacent said opening with an auxiliary outlet opening and an inlet opening, and a stove secured to the intake manifold and discharge section and having an intake passage therethrough communicating with the intake manifold and having a chamber surrounding said intake passage and communicating with the auxiliary outlet and inlet openings in said discharge section.

In testimony whereof I affix my signature.

ANDREW BACHLE.